SEQUENTIAL CIRCUITS EMPLOYING MAGNETIC ELEMENTS

Filed Dec. 18, 1959 4 Sheets-Sheet 1

INVENTOR
H. J. SCHULTE, JR.
BY
William H. Kamstra
ATTORNEY

April 16, 1963 H. J. SCHULTE, JR 3,086,124

SEQUENTIAL CIRCUITS EMPLOYING MAGNETIC ELEMENTS

Filed Dec. 18, 1959 4 Sheets-Sheet 2

INVENTOR
H. J. SCHULTE, JR.
BY
William H. Kamstra
ATTORNEY

April 16, 1963 H. J. SCHULTE, JR 3,086,124

SEQUENTIAL CIRCUITS EMPLOYING MAGNETIC ELEMENTS

Filed Dec. 18, 1959 4 Sheets-Sheet 3

INVENTOR
H. J. SCHULTE, JR.
BY
William H. Kamstra
ATTORNEY

April 16, 1963 H. J. SCHULTE, JR 3,086,124

SEQUENTIAL CIRCUITS EMPLOYING MAGNETIC ELEMENTS

Filed Dec. 18, 1959 4 Sheets-Sheet 4

INVENTOR
H. J. SCHULTE, JR.
BY
William H. Kamstra
ATTORNEY

United States Patent Office 3,086,124
Patented Apr. 16, 1963

3,086,124

SEQUENTIAL CIRCUITS EMPLOYING MAGNETIC ELEMENTS

Harry J. Schulte, Jr., Whippany, N.J., assignor to Bell Telephone Laboratories, Incorporated, New York, N.Y., a corporation of New York Filed Dec. 18, 1959, Ser. No. 860,548
18 Claims. (Cl. 307—88)

This invention relates to information handling circuits and more particularly to such circuits in which magnetic memory devices are employed as basic information storage elements.

Information handling circuits capable of receiving groups of electrical signals representative of discrete information values and of producing, either simultaneously or in a timed sequence, other groups of electrical signals which bear a relationship to the received groups, are well known. In order to accomplish the information handling operation, the information values must frequently be temporarily or permanently stored and a means for the selective switching of the representative signals must be provided for. One device in which these functions are advantageously combined is the toroidal magnetic core having square loop hysteresis properties. Information handling circuits of the character contemplated herein employing such devices, such as shift registers, stepping switches, counters, and the like, are also well known in the art and comprise important components of computer and data processing systems, for example. A related class of circuits also advantageously adapted to employ conventional toroidal cores are conversion circuits capable of accepting a group of information representative electrical signals simultaneously and making them available in a timed sequence or, conversely, accepting such signals in a timed sequence and producing their counterparts simultaneously as a group. The application of such conversion circuits will be readily understood by one skilled in the art, and whichever arrangement is to be employed will be dictated by considerations such as speed of operation, available equipment, and the like.

A magnetic toroidal core shift register circuit may be readily adapted to perform a conversion operation and provides a convenient reference for describing the objects and advantages of the present invention. As is well known, such a shift register circuit is divided into a plurality of stages, each stage storing an information bit during its traversal of the register. A group of information bits are serially introduced into the register in an initial stage and shifted along by the application of periodically applied advance pulses. The information bits may be temporarily stored in the register and then serially shifted out of a last stage by the application of the same advance pulses. However, by providing output windings at particular stages or at each stage, information bits stored in the latter stages may be made available in parallel form.

Although the advent of magnetic cores of the toroidal form has proven highly advantageous in the fabrication of faster and more reliable circuits of the type referred to in the foregoing, the use of such toroidal cores has not been without attendant problems. Thus, for example, where the shift of an information bit is caused by the switching of a core from one of its remanent states to the other, diodes are generally necessitated in the interconnecting circuits to insure the shift of information in one direction only. Although the reliability of magnetic cores is well known, this reliability may frequently be offset by a lesser performance of the diodes employed. Further, the relatively high forward resistance of the diodes contributes substantially to the power requirements of a circuit. In order to offer dependable performance, magnetic toroidal cores also demand a high degree of uniformity in core characteristics. Thus, each must be tested and individually handled. Such handling during fabrication of the circuit may also cause damages and defects not readily detectable until after the circuit has been wired. As a result, the care and attention required because of their fragility frequently add substantially to the total cost of a circuit in which the cores are employed.

Accordingly, it is an object of this invention to provide a new and improved circuit capable of handling and storing a sequence of information representative electrical signals.

It is another object of this invention to accomplish the conversion of groups of information signals occurring in a timed sequence to corresponding groups of signals occurring simultaneously.

It is also an object of this invention to accomplish the conversion of groups of information signals occurring simultaneously to corresponding groups of signals occurring in a timed sequence.

It is yet another object of this invention to provide a new and novel sequential stepping switch.

A further object of this invention is to accomplish a substantial reduction in circuit components in magnetic sequential information handling circuits.

The foregoing and other objects of this invention are realized in specific illustrative embodiments thereof utilizing a plurality of ladder-like magnetic structures as the basic memory and switching elements. These multiapertured structures are advantageously of a material capable of assuming stable remanent flux states and the apertures of each structure are formed to present a pair of parallel side rails having a plurality of transverse rungs or legs therebetween. Such a magnetic structure has been described, for example, in the copending application of T. H. Crowley and U. F. Gianola, Serial No. 732,549, filed May 2, 1958, now Patent No. 2,963,591, issued December 6, 1960. The legs and side rails are flux limited, that is, all of these portions of the magnetic element have substantially the same minimum cross-sectional area.

In a general sequentially operating circuit according to the principles of this invention a plurality of the foregoing multiapertured magnetic elements are associated together in a series relationship. A normal or reset flux distribution pattern in each of the elements may conveniently be one in which an end or output leg is flux saturated in one direction. This pattern may be compared with the set pattern which then exists in an element when the same leg is essentially unsaturated or saturated in the other direction. By means of a parallel wiring arrangement and two-phase clock sources, each of the elements is driven to the reset state by a phase $\Phi_1$ reset clock pulse. Only one of the elements is in the set magnetic state prior to the $\Phi_1$ reset pulse and, as a result of the latter pulse, a flux excursion is caused in the output leg of this one element which in turn induces an output signal in a coupled output winding. The latter signal is employed to trigger a combination of set pulse sources which, as a result, are effective to set the next succeeding element in its set magnetic flux pattern. The set pulses are timed to overlap a following phase $\Phi_2$ set clock pulse, and the combination of these pulses advantageously drives the next succeeding element to its set flux pattern. The setting and resetting of each element in turn is continued as a result of the continually applied clock pulses and combinations of set pulses and, by means of reentrant circuitry, the set magnetic flux pattern may be continuously recirculated along the series of elements. By providing each of the output legs of the elements with an additional output winding the successive switching of the output legs of the elements may be detected as a continuous series of output signals appearing on the terminals of the latter output windings.

The foregoing illustrative sequential circuit may advantageously be adapted as a serial-to-parallel conversion circuit or as a parallel-to-serial conversion circuit. The latter circuit may be achieved by connecting the output windings of the output legs of the elements respectively to a plurality of switching means. By simultaneously presetting the latter switches in accordance with a predetermined code, the latter switches control preferential serial current paths which paths are controlled to bypass particular ones of the output windings. A timed sequence of output signals may thus be generated and made available at a terminal, which sequence of signals corresponds to the predetermined code.

According to another aspect of this invention, a serial-to-parallel conversion circuit is achieved. This circuit utilizes magnetic elements similar to those briefly described in the foregoing and a timed sequence of coded input signals applied to a lead coupled to one of the legs of each of the elements. The output legs of this circuit will be sequentially switched to the set magnetic condition only when the coded input signals occur in addition to the combination of set pulses and these legs are not switched back to the reset condition by the phase $\Phi_1$ reset pulses. Rather, at the end of the timed sequence of input pulses, a read-out pulse is applied to a lead coupled to a flux path, including the output leg of each element. The output legs are switched to the reset condition by the read-out pulse, and signals are simultaneously generated in output coils coupled to these legs which signals correspond to the predetermined code of the input signals.

Thus, according to one feature of this invention multiapertured magnetic elements are utilized in a sequential stepping switch circuit having a plurality of set pulse sources connected thereto for successively setting output legs of the elements.

It is another feature of this invention that a sequential stepping switch utilizing multiapertured magnetic elements has a plurality of set pulse sources connected thereto whereby output legs of the elements are switched responsive to the energization of different combinations of the set pulse sources.

It is yet another feature of this invention that control circuitry link particular ones of the output legs of multiapertured magnetic elements in a stepping switch of this invention to particular combinations of set pulse sources. The resetting of each output leg thereby causes the energization of those set pulse sources which are effective to cause the setting of a subsequent output leg.

According to another feature of this invention, selectively settable switching means are connected to respective ones of the multiapertured magnetic elements of a stepping switch circuit of this invention to effect the transformation of binary information introduced into the settable switching means in parallel form to binary information appearing at a terminal of the circuit in serial form.

It is still another feature of this invention that a sequential stepping switch utilizing multiapertured magnetic elements has a plurality of set pulse sources and an input pulse source connected thereto whereby each output leg of the switch is set responsive to the energization of a different combination of set pulse sources concurrently with the energization of the input pulse source.

This invention, together with the foregoing and other objects and features thereof, will be better understood from a consideration of the detailed description thereof which follows when taken in conjunction with the accompanying drawing in which.

Figure 1:
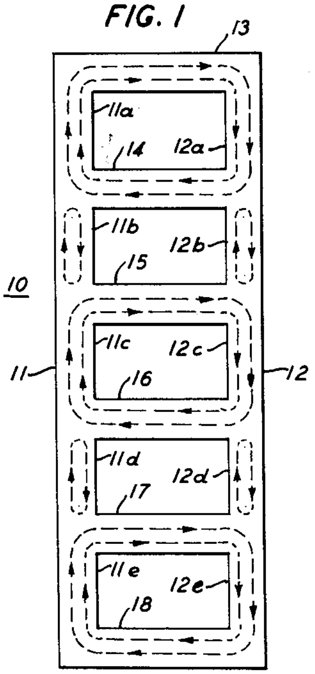
FIG. 1 depicts an illustrative multiapertured magnetic element used in the specific embodiment of this invention depicted in FIG. 2 with the magnetic flux distribution symbolized therein at one stage of its operation.

FIG. 1 depicts a multiapertured magnetic element 10 utilized in a sequential stepping switch circuit to be described in connection with FIG. 2. The element 10 comprises side rails 11 and 12 and legs 13 through 18. The side rails 11 and 12 are divided by the legs 13 through 18 into sections 11*a* through 11*e* and 12*a* through 12*e*, respectively. The element 10 is advantageously formed of a magnetic material having square loop hysteresis characteristics, and the legs are flux limited, that is, all of the legs have substantially the same minimum cross-sectional areas. Such an element is described in detail in the copending application of T. H. Crowley and U. F. Gianola referred to previously herein. An initial magnetic state of the element 10 is depicted by the broken parallel lines shown in the legs and side rails of the element 10 of FIG. 1. The arrowheads on the lines indicate the magnetic polarity of that portion of the element. Portions of the element 10 essentially nonmagnetized may be symbolized by a closed line having arrowheads pointing in opposite directions. Portions which are magnetically saturated are depicted by the two lines having their respective arrowheads pointing in the same direction. The flux distribution pattern of FIG. 1 will be referred to in further detail in connection with the description of the embodiment of this invention shown in FIG. 2.

Figure 2:
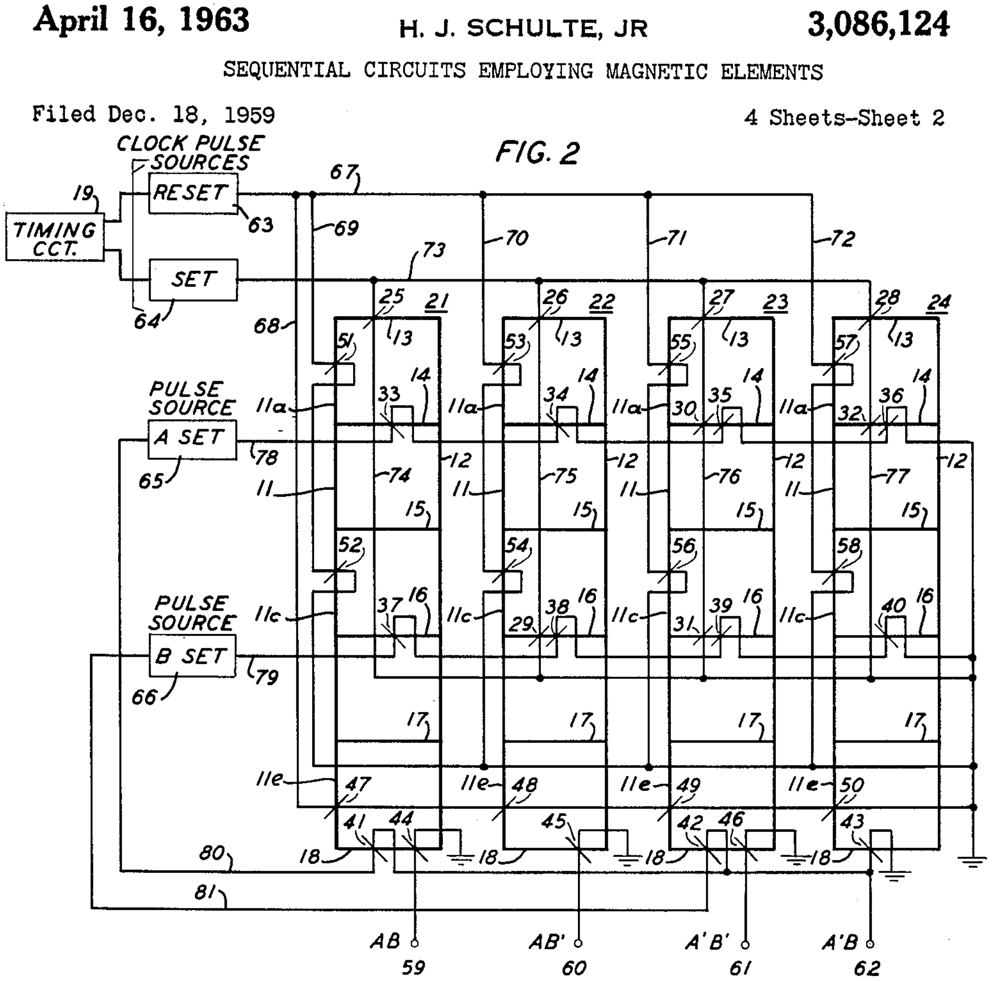
FIG. 2 shows a schematic diagram of one illustrative embodiment of a sequential stepping switch circuit of this invention depicted in mirror symbol notation.

FIG. 2 depicts a schematic diagram of one specific illustrative embodiment of a stepping switch circuit according to the principles of this invention. Elements 21, 22, 23 and 24 are similar to the element 10 shown in FIG. 1 but for convenience of description are shown with the legs and side rails depicted by single solid lines. Also for convenience of presentation numerous windings inductively coupled to the elements of FIG. 2 are shown in the conventional manner known in the magnetic core art as "mirror symbols." This denotation may conveniently be applied not only as a convenient means for representing windings but also as an aid in determining the direction of the magnetic flux produced as a result of current pulses applied to the windings. As applied to the multiapertured magnetic elements employed in this invention, the convention is that a positive current flow is considered to be reflected off the mirror to generate a flux in the direction of the reflection. The use of "mirror symbols" in connection with magnetic cores is described in detail, for example, in "Pulse Switching Circuits Using Magnetic Cores," by M. Karnaugh, Proceedings of the I.R.E., pages 572 through 574, May 1955.

The illustrative embodiment of this invention shown in FIG. 2 comprises a plurality of multiapertured magnetic elements 21 through 24, each of which in geometry and relative dimensions is identical to the element 10 generally described in connection with FIG. 1. Accordingly, the various portions and members of the elements 21 through 24 will be designated by the same reference characters that were used for the same portions and members of element 10. Each of the magnetic elements 21 through 24 has a plurality of energizing windings thereon inductively coupled to various legs and side rails. Thus, the elements 21 through 24 have respectively coupled to legs 13 thereof set windings 25 through 28, to legs 14 thereof set windings 33 through 36, and to legs 16 thereof set windings 37 through 40. The elements 22 and 23 in addition have coupled to the legs 16 thereof set windings 29 and 31, respectively, and the elements 23 and 24 have coupled to the legs 14 thereof set windings 30 and 32, respectively. The set windings so far described as being coupled to the various legs of the elements 21 through 24 are connected in a plurality of set circuits. A first set circuit 73 connects, by means of a number of parallel branches, particular set windings of the elements 21 through 24. Thus, specifically, a first branch 74 includes the set winding 25 of the element 21. A second branch 75 includes the set windings 26 and 29 of the element 22, a third branch 76 includes the set windings 27, 30 and 31, and a fourth branch 77 includes the set windings 28 and 32 of the element 24.

A second set circuit 78 connects in series the set windings 33 through 36 and a third set circuit 79 connects in series the set windings 37 through 40 of the elements 21 through 24, respectively. Each of the set circuits 73, 78 and 79 terminates at one end in ground. The set circuit 73 terminates at the other end in a set clock pulse source 64 operated in a $\Phi_2$ phase of operation. The set circuit 78 terminates at its other end in an A source of set pulses 65 and the set circuit 79 terminates at its other end in a B source of set pulses 66.

Each of the elements 21 through 24 also has a plurality of reset windings inductively coupled to the side rails thereof. Thus the elements 21 through 24 have coupled respectively to the side rail portions 11*a* thereof, reset windings 51, 53, 55 and 57, to the side rail portions 11*c*, reset windings 52, 54, 56 and 58, and to the side rail portions 11*e*, reset windings 47 through 50. The reset windings of each of the elements 21 through 24 are connected in parallel branches of a reset circuit 67. Thus the reset windings 47 through 50 are connected in series in a branch 68 of the circuit 67 and the pairs of windings 51—52, 53—54, 55—56 and 57—58, of the elements 21 through 24, respectively, are serially connected in respective parallel branches 69, 70, 71 and 72. The reset circuit 67 is also connected at one end to ground and is connected at its other end to a reset clock pulse source 63 operated in a $\Phi_1$ phase of operation. The elements 21 through 24 have additionally coupled to output legs 18 thereof, output windings 44, 45, 46 and 43, respectively, which latter output windings are connected between ground and output terminals 59 through 62, respectively. The output legs 18 of the elements 21 and 23 have additionally coupled thereto control windings 41 and 42, respectively. The output winding 43 of the element 24, in addition to being connected to the output terminal 62, is connected in series with the control output winding 41 of the element 21 in a control circuit 80. The output winding 43 of the element 24 is also additionally connected in series with the control output winding 42 of the element 23 in a second control circuit 81. The control circuit 80 is connected to the A set pulse source 65 and the control circuit 81 is connected to the B set pulse source 66 to effect controls in a manner to be described in connection with an illustrative operation of the embodiment of this invention of FIG. 2 to be described hereinafter.

A timing circuit 19 is connected for control purposes to the reset clock pulse source 63 and to the set clock pulse source 64. Each of the pulse sources so far described may comprise any suitable circuit well known in the art capable of providing current pulses of the polarity and magnitude to be described hereinafter, such as, for example, monopulsers, and accordingly, since such circuits are readily envisioned by one skilled in the art, they need not be described with greater particularity herein. The sense of the various set, reset and output windings thus far described, will be considered also in connection with a description of an illustrative operation of this embodiment of this invention hereinafter.

Bearing in mind the foregoing organization and structure of the embodiment of this invention of FIG. 2, an illustrative cycle of operation thereof may now be described. For this purpose it will be assumed that a first of a series of output signals to be generated is to be made available at the output terminal 61. Initially a positive current pulse from the reset clock pulse source 63 in a $\Phi_1$ phase generates, by means of the reset windings 47 through 58 of the elements 21 through 24, a flux distribution pattern as shown in FIG. 1. In a subsequent $\Phi_2$ phase of operation a positive current pulse from the set clock pulse source 64 will cause, by means of the set windings 25 through 32, a redistribution of the normal flux pattern as follows. The sense of the set winding 25 coupled to the leg 13 of the element 21 is such that the applied set pulse switches the flux in the latter leg. The switching flux at this time is free to close through the shortest path presented by the legs of the element 21, that is, through the leg 14 and no other change in the flux distribution occurs at this time from that shown in FIG. 1. This closure is in accordance with the known principle of flux propagation in magnetic structures that a switching flux will close first through the shortest path presented without regard to the magnitude of the applied drive.

As a result of the magnetomotive force generated in the set winding 26 of the element 22 by the applied set pulse, the same redistribution of the flux pattern takes place as that described for the element 21. The set pulse is also applied to the set winding 29 of this element; however, the sense of the latter winding is such that a magnetomotive force is generated which is in a direction in which the coupled leg 16 is already magnetically saturated. Accordingly, no appreciable flux change takes place in the latter leg.

In the element 23 the set pulse from the set clock pulse source 64 in the $\Phi_2$ phase of operation is applied simultaneously to the set windings 27, 30 and 31, coupled to the legs 13, 14 and 16, respectively. In the case of the latter two legs the magnetomotive forces generated will be such, in view of the sense of the windings 30 and 31, as to maintain the flux in the direction in which the legs 14 and 16 are already magnetically saturated. The latter legs are thus denied as closure paths to any switching flux induced in the leg 13. The legs 15 and 17 are similarly denied as closure paths since these legs are already saturated in the direction of an induced switching flux in the leg 13. In view of the flux limited construction of the element 23 as previously referred to, the closures of each of the saturation fluxes permits only a limited closure of a switching flux induced in the leg 13. The only remaining closure path is thus through the output leg 18 of the element 23, and, due to the limited closure paths available in other portions of the element 23, only a partial switching of this leg 18 takes place. The latter leg thus in fact is rendered effectively unmagnetized which condition is the set magnetic condition of the element 23.

In the element 24 the set pulse in phase $\Phi_2$ is applied to the set windings 28 and 32 which are coupled to the legs 13 and 14, respectively. The magnetomotive force generated in the set winding 32 maintains the flux in the leg 14 in the normal saturated direction thus preventing the closure of the induced switching flux in the leg 13 through the leg 14. Because of the saturated condition of the leg 15, the next shortest path for the switching flux is through the leg 16 in which leg a partial switching occurs. The switching is partial in view of the closure paths already in use in the flux limited structure. At the termination of the particular $\Phi_2$ operative phase being described, it is thus clear that the normal saturation flux in the output legs 18 of the elements 21, 22 and 24 remains unchanged and the output leg 18 of the element 23 has been demagnetized, that is, driven to a set magnetic condition.

A subsequent $\Phi_1$ phase of operation is initiated by a timing pulse applied from the timing circuit 19 to the reset clock pulse source 63. As a result, a positive pulse is again applied to the reset circuit 67, which reset pulse acts to restore the normal flux distribution pattern to each of the elements 21 through 24 in the manner described hereinbefore. In the elements 21 and 22 this flux distribution pattern restoration will cause no appreciable flux changes in the output legs 18 since these legs were not disturbed during the $\Phi_2$ operative phase. A flux switching will, however, occur in the output leg 18 of the element 23 since this leg was set, or substantially demagnetized, during the $\Phi_2$ phase of operation. The flux switching in the output leg 18 of the element 23 thus resulting induces an output signal in the output winding 46 also coupled to the latter output leg, which output signal will be available at the terminal 61 as a first of the signals to be generated during a cycle of operation of the circuit of FIG. 2. Since during the $\Phi_2$ phase of operation no flux switching was caused in the output leg 18 of the element 24, the reset flux restoration will likewise cause no significant flux change in the latter output leg. The terminal 61 will accordingly be the only one having a signal appearing thereon as a result of the last applied reset pulse to the reset circuit 67.

Returning to a consideration of the resetting of the previously set element 23, a further result of the resetting of its output leg 18 may be described. The latter flux switching also induces a control output signal in the control output winding 42 also coupled to the output leg 18 of the element 23. This control output signal is applied via the circuit 81 to control the energization of the set pulse source 66. This source 66, which may conveniently comprise a monopulser as previously mentioned, is operated to apply a positive B set pulse to the circuit 79 and hence to each of the set windings 37 through 40 of the elements 21 through 24, respectively. The timing of the B set pulse is controlled to overlap with the subsequently applied set clock pulse applied from the set clock pulse source 64 during the following $\Phi_2$ operative phase. As a result, during the latter phase the effect of the set drive applied from the set pulse source 66 must now be considered in addition to the effect of the drive applied from the $\Phi_2$ set clock pulse source 64 previously referred to herein.

The combined effect of the B set pulse from source 66 and the set clock pulse from source 64 during the following $\Phi_2$ operative phase is to produce a redistribution of the normal flux pattern as follows. The magnetomotive force generated by the set clock pulse from source 64 in the set winding 25 coupled to leg 13 of element 21 will cause a flux reversal in the leg 13 which will again close through the leg 14, as described previously. The B set pulse from source 66 is applied to the winding 37 coupled to the leg 16 of element 21; however, the sense of this winding is such that the magnetomotive force generated is in the direction in which the coupled leg 16 is already magnetically saturated. Accordingly, no appreciable flux change occurs in the latter leg.

In element 22 the set clock pulse from source 64 is applied to the winding 26 coupled to leg 13 and to winding 29 coupled to leg 16, while the B set pulse from source 66 is applied to the winding 38 also coupled to the leg 16. The sense of the winding 26 is such that the set pulse switches the flux in leg 13. The switching flux again closes through leg 14. The sense of the windings 29 and 38 are such that the magnetomotive forces generated in these windings are in opposition and effectively cancel each other.

In the element 23 the set clock pulse from source 64 is applied to the winding 27 coupled to leg 13, the winding 30 coupled to the leg 14 and the winding 31 coupled to the leg 16, while simultaneously the B set pulse from source 66 is applied to the winding 39 coupled to the leg 16. The magnetomotive force generated in winding 27 will cause a flux switching which closes through leg 16; the magnetomotive force generated in winding 30 holds leg 14 in the normal saturated direction thus preventing switching flux closure through leg 14. The sense of the windings 31 and 39 are such that the magnetomotive forces generated in these windings oppose and cancel each other thereby allowing the leg 16 to serve as a closure path for the switching flux.

In the element 24 the set clock pulse from source 64 is applied to winding 28 coupled to leg 13 and winding 32 coupled to leg 14, while a simultaneous B pulse from source 66 is applied to winding 40 coupled to the leg 16. The pulse applied to winding 28 causes a switching of flux in the leg 13. The senses of the windings 32 and 40 are such that the magnetomotive forces generated in these windings hold the flux of the respective legs 14 and 16 in the direction to which they already are saturated thereby denying these legs as flux closure paths. The legs 15 and 17 are also denied as flux closure paths since these legs are already saturated in the direction of an induced switching flux in the leg 13. The only flux closure path remaining is therefore the output leg 18 of the element 24. The flux switching renders this leg effectively unmagnetized which condition is the set magnetic condition of the element 24. Thus, at the close of this particular $\Phi_2$ operative phase, the normal saturation flux in the output legs 18 of the elements 21, 22 and 23 remains undisturbed while the output leg 18 of the element 24 has been demagnetized, that is, driven to a set magnetic condition.

A subsequent $\Phi_1$ phase of operation is again initiated by a timing pulse applied from the timing circuit 19 to the reset clock pulse source 63 causing a positive reset pulse to again be applied to the reset circuit 67, which pulse acts to restore the normal flux distribution pattern in each of the elements 21 through 24 in the manner described previously herein. This flux distribution pattern restoration causes no appreciable flux changes in the output legs 18 of elements 21, 22 and 23 since these legs were not disturbed during the $\Phi_2$ operative phase. A flux switching will occur, however, in the output leg 18 of the element 24 which was set during the $\Phi_2$ phase of operation. The flux switching in this output leg thus resulting induces an output signal in the output winding 43 also coupled to this leg, which output signal will be available at the terminal 62 as a second of the signals to be generated during a cycle of operation of the circuit of FIG. 2. Since no appreciable flux switching occurs in the output legs 18 of the elements 21, 22 and 23 responsive to the reset clock pulse from source 63, the terminal 62 will accordingly be the only one having a signal appearing thereon as a result of the last applied $\Phi_1$ reset clock pulse to the reset circuit 67.

The signal induced in the output winding 43 is also applied via the circuit 80 and the circuit 81 at this time to control the energization of the set pulse sources 65 and 66, respectively. The source 65 operates to apply an A set pulse to the circuit 78 and hence to each of the set windings 33 through 36 of the elements 21 through 24, respectively, and the source 66 operates to apply a B set pulse to the circuit 79 and hence to each of the set windings 37 through 40 of the elements 21 through 24, respectively. The timing of the A and B set pulses is again controlled to overlap the subsequently applied set clock pulse from source 64 during the next $\Phi_2$ operative phase. Thus, during the next $\Phi_2$ phase the effect of the set drive applied from both sources 65 and 66 must now be considered in addition to the effect of the drive applied from the $\Phi_2$ set clock pulse source 64.

The combined effect of the A and B set pulses from sources 65 and 66, respectively, and the set clock pulse from source 64 during the following $\Phi_2$ phase of operation is to produce a redistribution of the normal flux pattern as follows. The magnetomotive force generated by the set clock pulse from source 64 in the set winding 25 coupled to the leg 13 of element 21 will cause a flux reversal in the leg 13. The A set pulse from source 65 is applied to winding 33 coupled to leg 14 and the B set pulse from source 66 is applied to winding 37 coupled to leg 16 of the element 21. The senses of the windings 33 and 37 are such that the effect of the set pulses applied to these windings is to hold the flux condition of the legs 14 and 16 in the direction to which they are already magnetically saturated, thereby denying these legs as closure paths to the switching flux induced in the leg 13. The legs 15 and 17 are similarly denied as closure paths since these legs are already saturated in the direction of an induced switching flux in the leg 13. The only remaining closure path is therefore through the output leg 18 of element 21. The flux switching through leg 18 renders this leg effectively unmagnetized which condition is the set magnetic condition of the element 21.

In the element 22 a set clock pulse from source 64 is applied to winding 26 coupled to leg 13 and to the winding 29 coupled to the leg 16, while an A set pulse is applied to the winding 34 coupled to leg 14 and a B set pulse is applied to the winding 38 coupled to leg 16. The set pulse applied to winding 26 causes a flux switching in leg 13. The A set pulse applied to winding 34 holds the flux of leg 14 in the direction to which it was previously saturated, thus denying this leg as a flux closure path. The senses of the windings 29 and 38 coupled to leg 16 are such, however, that the magnetomotive forces generated in these windings effectively cancel each other thereby permitting flux closure to occur through the leg 16.

In the element 23 the set clock pulse from source 64 is applied to winding 27 coupled to leg 13, winding 30 coupled to leg 14, and to winding 31 coupled to leg 16, while the A set pulse from source 65 is applied to winding 35 coupled to leg 14, and the B set pulse from source 66 is applied to winding 39 coupled to leg 16. The pulse applied to winding 27 again produces a flux reversal in leg 13. The senses of the windings 30 and 35 are such that the magnetomotive forces generated in these windings cancel, thereby permitting the switching flux to close through the leg 14. The senses of the windings 31 and 39 are also such that the magnetomotive forces generated therein cancel thus preventing any appreciable flux change in the leg 16.

In element 24 the set clock pulse from source 64 is applied to winding 28 coupled to leg 13 and to winding 32 coupled to leg 14, while the A set pulse from source 65 is applied to winding 36 coupled to leg 14 and the B set pulse from source 66 is applied to winding 40 coupled to leg 16. The pulse applied to winding 28 again produces a flux reversal in leg 13. The senses of the windings 32 and 36 are such that the magnetomotive forces generated in these windings cancel, thereby permitting flux closure to occur through the leg 14. The sense of the winding 40 is such that the magnetomotive force generated in this winding is in a direction in which the leg 16 is already magnetically saturated and accordingly no appreciable flux change occurs in this leg.

Thus, at the close of this particular $\Phi_2$ operative phase the normal saturation flux in the output legs 18 of the elements 22, 23 and 24 remains undisturbed, while the output leg 18 of the element 21 has now been driven to a set magnetic condition.

A subsequent $\Phi_1$ phase of operation is again initiated by a timing pulse applied from the timing circuit 19 to the reset clock pulse source 63 causing a phase $\Phi_1$ positive reset pulse to again be applied to the reset circuit 67, which pulse acts to effect a restoration of the normal flux distribution pattern in each of the elements 21 through 24 in the manner described hereinbefore. This flux distribution pattern restoration causes no appreciable flux changes in the output legs 18 of elements 22, 23 and 24, since these legs were not disturbed during the $\Phi_2$ operative phase. A flux switching will occur, however, in the output leg 18 of the element 21 which was set during the $\Phi_2$ phase of operation. The resulting flux switching in this output leg induces an output signal in the output winding 44 also coupled to this leg which output signal will be available at the terminal 59 as a third of the signals to be generated during a cycle of operation of the circuit of FIG. 2.

A further result of the resetting of the output leg 18 of element 21 may also be described. The flux switching in this leg will also induce a signal in the control winding 41 also coupled to this leg. This control output signal is applied via the circuit 80 at this time to control the energization of the set pulse source 65 alone. This source 65 then operates to supply an A set pulse to the circuit 78 and hence to each of the set windings 33 through 36 of the elements 21 through 24, respectively. The timing of the A set pulse is again controlled to overlap the subsequently applied set pulse from the source 64 during the following $\Phi_2$ operative phase. As a result, during this $\Phi_2$ phase the effect of the set drive applied from the set pulse source 65 must be considered in addition to the effect of the drive applied from the set clock pulse source 64.

The combined effect of the A set pulse from source 65 and the set clock pulse from source 64 during the following $\Phi_2$ operative phase is to produce a redistribution of the normal flux pattern as follows. The magnetomotive force generated in the set winding 25 coupled to the leg 13 from source 64 causes a flux reversal in the leg 13. The A set pulse from source 65 is applied to the winding 33 coupled to the leg 14 and, because of the sense of winding 33, holds the flux condition of leg 14 in the direction to which it is already magnetically saturated, thereby denying this leg as a closure path to the switching flux induced in the leg 13. The flux therefore closes through leg 16 since it is the closest available flux path at this time.

In the element 22 a set clock pulse from source 64 is applied to winding 26 coupled to leg 13 and to winding 29 coupled to the leg 16, while an A set pulse is applied to the winding 34 coupled to leg 14. The set pulse applied to winding 26 causes a flux switching in leg 13. The set pulse applied to winding 29 and the A set pulse applied to winding 34 hold, respectively, the flux of legs 16 and 14 in the direction to which it was previously saturated, thereby denying these legs as flux closure paths. The only remaining closure path is therefore through the output leg 18 of element 22. The flux switching through this leg renders this leg effectively unmagnetized which condition is the set magnetic condition of the element 22.

In the element 23 the set clock pulse from source 64 is applied to winding 27 coupled to leg 13, winding 30 coupled to leg 14, and winding 31 coupled to leg 16, while an A set pulse from source 65 is applied to winding 35 also coupled to leg 14. The pulse applied to winding 27 again produces a flux reversal in the leg 13. The senses of the windings 30 and 35 are such that the magnetomotive forces generated in these windings effectively cancel each other, thereby permitting the switching flux to close through leg 14. The sense of the winding 31 is such that the magnetomotive force generated in this winding is in a direction in which the leg 16 is already magnetically saturated and, accordingly, no appreciable flux change takes place in the latter leg.

In element 24 the set clock pulse from source 64 is again applied to winding 28 coupled to leg 13 and to winding 32 coupled to leg 14, while the A set pulse from the source 65 is applied to the winding 36 also coupled to leg 14. The pulse applied to winding 28 again produces a flux reversal in leg 13. The senses of the windings 32 and 36 are such that the magnetomotive forces generated in these windings effectively cancel each other, thereby permitting flux closure to occur through the leg 14.

Thus, at the close of this particular $\Phi_2$ operative phase, the normal saturation flux in the output legs 18 of the elements 21, 23 and 24 remains undisturbed, while the output leg 18 of the element 22 has now been driven to a set magnetic condition.

A subsequent $\Phi_1$ phase of operation is again initiated by a timing pulse applied from the timing circuit 19 to the reset clock pulse source 63, causing a positive reset pulse to again be applied to the reset circuit 67, which pulse acts to effect a restoration of the normal flux distribution in each of the elements 21 through 24 in the manner previously described herein. This flux distribution pattern restoration causes no appreciable flux changes in the output legs 18 of the elements 21, 23 and 24 since these legs were not disturbed during the $\Phi_2$ operative phase. A flux switching will occur, however, in the output leg 18 of the element 22 which was set during the previous $\Phi_2$ phase of operation. The resulting flux switching in this output leg induces an output signal in the output winding 45 also coupled to this leg, which output signal will be available at the terminal 60, as a fourth of the signals to be generated during a cycle of operation of the circuit of FIG. 2.

Since there is no control winding coupled to the output leg 18 of element 22 and since winding 45 is not connected in either the circuit 80 or the circuit 81, neither of the set pulse sources 65 and 66 will be energized responsive to the flux shift in the output leg 18 of element 22 during the resetting of this element. Consequently, during the next $\Phi_2$ operative phase of the circuit of FIG. 2, the set clock pulse from the source 64 is again applied without an overlapping pulse from either source 65 or source 66 being present. Since this was the operative phase of the circuit first described it can be seen that a full cycle of operation of the circuit has been described, that the operation of the circuit of FIG. 2 is continuous and that a sequential stepping switch is realized.

The symbols AB, AB′, A′B′ and A′B are shown adjacent the elements 21, 22, 23 and 24, respectively, of FIG. 2. This has been done to illustrate more clearly which element is set by the various combinations of triggered set pulse sources. The "primes" are used to refer to the times when the primed set pulse source is not triggered. Thus AB next to element 21 shows that it is set when both the A pulse source 65 and the B pulse source 66 are triggered. AB′ next to element 22 shows that it is set when only A set source 65 is triggered, A′B′ next to element 23 shows that it is set when neither the A nor the B set source is triggered, and A′B next to element 24 shows that it is set when only the B set source 66 is triggered.

Reset windings 51 through 58 are shown as included in the embodiment of FIG. 2 and, as has been described, function to establish a basic flux distribution pattern in the magnetic elements. However, in view of the flux limited nature of the magnetic structures and because only the ultimate effect of flux changes in the structures on the output legs 18 is significant in the operation of this invention, a partial resetting by the windings 47 through 50 may be sufficient. However, the windings 51 through 58 are included to show a complete and full disclosure of this invention.

The operation has been described in terms of an illustrative circuit comprising four multiapertured magnetic elements and two binary coded pulse sources 65 and 66. However, other combinations may advantageously be used without departing from the principles of the present invention. For binary coded pulse sources in a more general case, such sources are used in a circuit intended to have a maximum of $2^n$ operative states by also using $2^n$ elements with each element having at least $2n+2$ legs. Besides binary coding, however, other methods of coding the pulse sources can be utilized, such as the combinational coding described in the following.

Figure 3A:
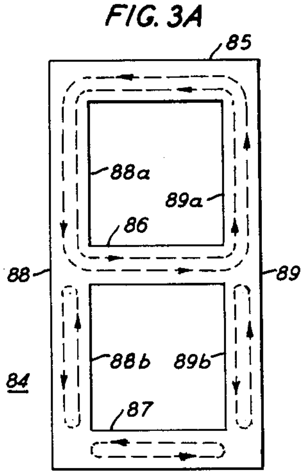
FIGS. 3A and 3B depict another illustrative multiapertured magnetic element used in another specific embodiment of this invention depicted in FIG. 4 with the magnetic flux distribution symbolized therein at various stages of its operation.
Figure 3B:
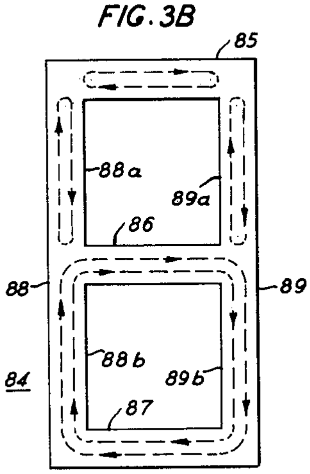
Figure 4:
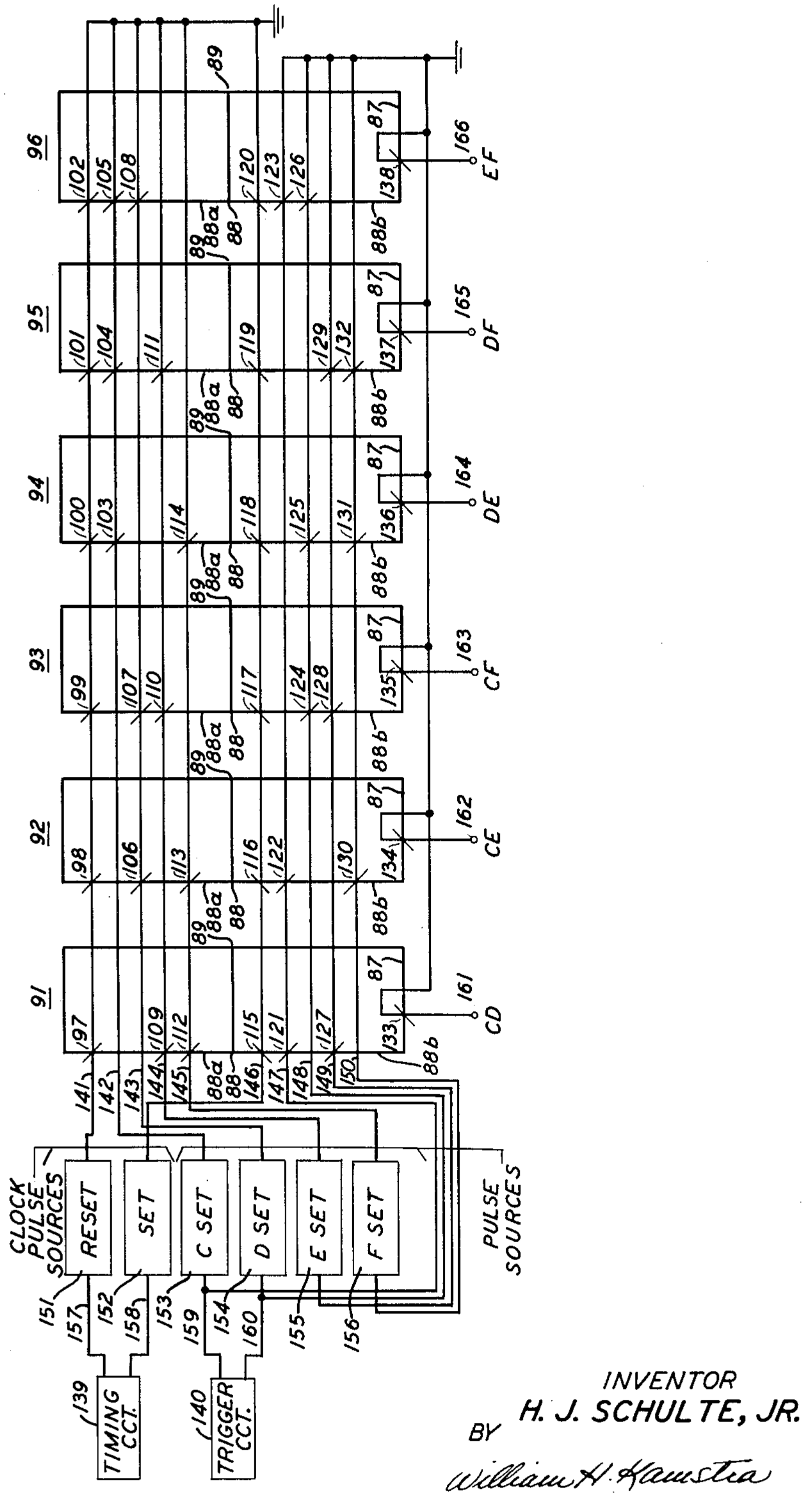
FIG. 4 depicts a schematic diagram of another illustrative embodiment of a sequential stepping switch circuit according to this invention also in mirror symbol notation.

FIGS. 3A and 3B depict a multiapertured magnetic element 84 used in the stepping switch circuit to be described in connection with FIG. 4. Element 84 of each of FIGS. 3A and 3B comprises side rails 88 and 89 and legs 85, 86 and 87. The side rails 88 and 89 are divided by the legs 85 through 87 into sections 88*a*, 88*b*, 89*a* and 89*b*. The element 84 is also advantageously formed of a magnetic material having square loop hysteresis characteristics and the legs and side rails are flux limited as described previously. The magnetic state of the element is depicted by the broken parallel lines shown in the legs and side rails of the element and as previously described in connection with the element of FIG. 1. In the embodiment of FIG. 4 to be described the magnetic flux conditions representative of a set and reset are reversed from that previously described in connection with the embodiment of FIG. 2. Thus, FIG. 3A represents the element 84 in the reset magnetic condition, and FIG. 3B represents the element 84 in the set magnetic condition.

FIG. 4 depicts a schematic diagram of another specific illustrative embodiment of a stepping switch circuit according to the principles of this invention which utilizes combinational coded pulse sources. Mirror symbols, described previously, are also used to represent the various windings inductively coupled to the magnetic elements of the switch. The side rails and legs of the magnetic elements of FIG. 4 are also shown as single solid lines for illustrative purposes.

The illustrative embodiment of this invention shown in FIG. 4 comprises a plurality of multiapertured magnetic elements 91 through 96, each of which in geometry and relative dimensions is identical to the element 84 generally described in connection with FIG. 3. Accordingly, the various portions and members of the elements 91 through 96 will be designated by the same reference characters that were used for the same portions and members of the element 84. Each of the magnetic elements 91 through 96 has a plurality of energizing windings thereon inductively coupled to various legs and side rails. Thus the elements 91 through 96 have coupled to the side rail portions 88*a* thereof the following set windings: windings 109 and 112 coupled to element 91; windings 106 and 113 coupled to element 92; windings 107 and 110 coupled to element 93; windings 103 and 114 coupled to element 94; windings 104 and 111 coupled to element 95; and windings 105 and 108 coupled to element 96. Additionally, the elements 91 through 96 have coupled to the side rail portions 88*b* thereof the set windings 115 through 120, respectively. The set windings so far described as being coupled to the various elements are connected in a plurality of set circuits. A first set circuit 142 connects the set windings 103 through 105 of the elements 94 through 96, respectively, a second set circuit 143 connects the set windings 106 through 108 of the elements 92, 93 and 96, respectively, a third set circuit 144 connects the set windings 109 through 111 of the elements 91, 93 and 95, respectively, a fourth set circuit 145 connects the set windings 112 through 114 of the elements 91, 92 and 94, respectively, and a fifth set circuit 146 connects the set windings 115 through 120 of the elements 91 through 96, respectively. Each of the set circuits 142 through 146 is connected at one end to ground. The set circuit 142 terminates at its other end in a C source of set pulses 153, the set circuit 143 terminates at its other end in a D source of set pulses 154, the set circuit 144 terminates at its other end in an E source of set pulses 155, the set circuit 145 terminates at its other end in an F source of set pulses 156, and the set circuit 146 terminates at its other end in a set clock pulse source 152 operated in a $\Phi_2$ phase of operation.

Reset windings 97 through 102 are also inductively coupled to the side rail portions 88*a* of the elements 91 through 96, respectively. A reset circuit 141 serially connects the windings 97 through 102 and is connected at one end to ground and at its other end to a reset clock pulse source 151 operated in a $\Phi_1$ phase of operation.

Additionally, the side rail portions 88*b* of the elements 91 through 96 have inductively coupled thereto the following control windings: windings 121 and 127 coupled to element 91; windings 122 and 130 coupled to element 92; windings 124 and 128 coupled to element 93; windings 125 and 131 coupled to element 94; windings 129 and 132 coupled to element 95; and windings 123 and 126 coupled to element 96. These control windings are connected in a plurality of control circuits with each control circuit connected at one end to ground and at the other end to one of the pulse sources 153 through 156. Thus control circuit 147 serially connects windings 121 through 123 and is connected at the other end to the C source of set pulses 153, control circuit 148 serially connects windings 124 through 126 and is connected at the other end to the D source of set pulses 154, control circuit 149 serially connects windings 127 through 129 and is connected at the other end to the E source of set pulses 155, and control circuit 150 serially connects windings 130 through 132 and is connected at the other end to the F source of set pulses 156.

Furthermore, output windings 133 through 138 are connected to the output legs 87 of the elements 91 through 96, respectively. These output windings are connected between ground and the output terminals 161 through 166, respectively.

A timing circuit 139 is connected for control purposes to the reset clock pulse source 151 and also to the set clock pulse source 152 via leads 157 and 158, respectively. A trigger circuit 140 is connected to the C pulse source 153 and to the D pulse source 154 via leads 159 and 160, respectively, for starting purposes.

Each of the pulse sources so far described may comprise any suitable circuit well known in the art capable of providing current pulses of the polarity and magnitude to be described hereinafter and, accordingly, are shown in block diagram form only herein. The timing circuit 139 and trigger circuit 140 may also comprise circuits well known in the art capable of providing pulses of a character to be described and, accordingly, are also shown in block diagram form.

Bearing in mind the foregoing organization and structure of the embodiment of this invention of FIG. 4, an illustrative cycle of operation thereof may now be described. Since the operation of this embodiment is closely similar to that previously described for the embodiment shown in FIG. 2, it may consequently be described in general terms.

Initially a positive current pulse in phase $\Phi_1$ from reset clock source 151 generates, by means of the reset windings 97 through 102 of the elements 91 through 96, a reset flux distribution pattern in each of the elements 91 through 96, as shown in FIG. 3A. A subsequent positive current pulse in phase $\Phi_2$ from source 152 tends to effect, by means of the set windings 115 through 120 of the elements 91 through 96, a flux reversal and to establish a set flux distribution pattern in each of the elements 91 through 96 as shown in FIG. 3B.

The condition of having none of the coded pulse sources 153 through 156 energized during a phase $\Phi_2$ pulse from pulse source 152 is not a part of the combinational coding in this embodiment and, consequently, a trigger circuit 140 connected to pulse sources 153 and 154 is shown in FIG. 4 which triggers these sources and causes them to transmit pulses coincident with the first phase $\Phi_2$ clock pulse from source 152.

Pulse sources 153 and 154 are thus triggered to transmit pulses coincident with the first phase $\Phi_2$ set clock pulse from source 152 and only element 91, as a result, is switched to the set condition. Current pulses from the sources 153 and 154 on windings 103 through 108 prevent the switching of elements 92 through 96. A subsequent phase $\Phi_1$ reset clock pulse from the source 152 resets element 91 inducing output signals in windings 121, 127 and 133. The signal from winding 133 is made available at output terminal 161, and the signals from windings 121 and 127 are transmitted via circuits 147 and 149, respectively, to trigger pulse sources 153 and 155.

Pulse sources 153 and 155 now transmit pulses which overlap the next phase $\Phi_2$ set clock pulse from source 152 and cause element 92 to switch to the set condition. Current pulses from the sources 153 and 155 on windings 103, 104, 105, 109, 110 and 111 prevent the switching of elements 91, 93, 94, 95 and 96. The subsequent phase $\Phi_1$ reset clock pulse source 151 resets element 92 inducing signals in windings 122, 130 and 134. The signal from winding 134 is made available at output terminal 162 and the signals from windings 122 and 130 are transmitted via circuits 147 and 150, respectively, to trigger pulse sources 153 and 156.

The foregoing setting and resetting operations in the $\Phi_2$ and $\Phi_1$ phases of operation as described in connection with the switching elements 91 and 92 are continued in a similar manner with respect to the remaining elements 93 through 96. Thus, each time an element is reset to generate an output pulse a different combination of set pulse sources is simultaneously triggered to set, in conjunction with the set clock pulse source 152, a succeeding one of the elements 93 through 96. The operation of the circuit is thus continuous and a sequential stepping switch is achieved.

The symbols CD, CE, CF, DE, DF and EF are shown adjacent the output terminals 161 through 166, respectively, of FIG. 4. This has been done to illustrate more clearly which element is set and, consequently, which output terminal receives a signal, by the various combinations of the coded set pulse sources. Thus, for example, CD adjacent terminal 161, associated with element 91, shows that this element is set during the stage of operation when the C pulse source 153 and the D pulse source 154 are energized. The other symbols similarly show which combination of coded pulse sources sets any particular one of the elements.

In another general case applicable to this invention, for a circuit using $n$ combinational coded pulse sources, $x$ of the $n$ set pulse sources are triggered to transmit pulses which coincide with each phase $\Phi_2$ pulse from the set clock pulse source operating in this phase. The possible number of operative states of the circuit will then be equal to the number of combinations of $n$ things taken $x$ at a time. The maximum number of operative states for such a circuit having $n$ coded pulse sources can be achieved by letting $x$ equal $n/2$. The circuit illustrated in FIG. 4 has four coded pulse sources 153 through 156, of which two are triggered to coincide with each pulse from the pulse source 152, and therefore, has six operative states since there are six possible combinations of four things, taken two at a time. For a combinational coded stepping switch circuit each multiapertured magnetic element need have only three legs and the number of legs per element need not increase with an increase in the number of operative states of the circuit.

Figure 5:
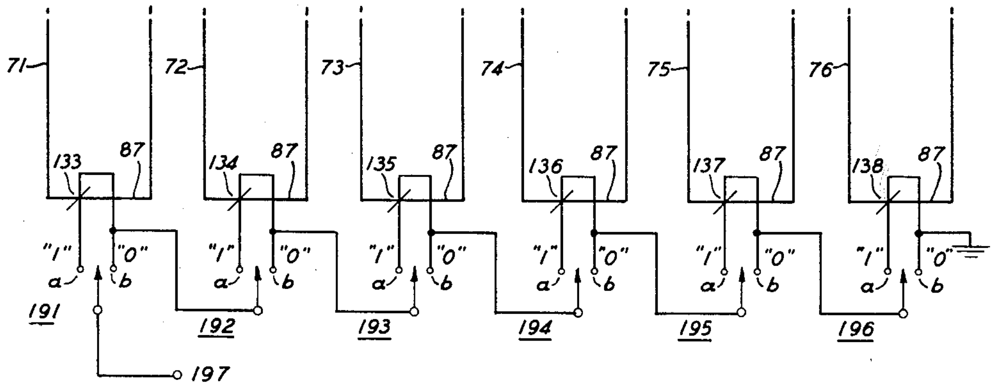
FIG. 5 depicts a partial schematic diagram of a selectively settable switching arrangement of a parallel-to-serial conversion circuit according to the principles of this invention.

FIG. 5 depicts a partial schematic diagram of an embodiment of a parallel-to-serial conversion circuit according to the principles of this invention comprising the embodiment of FIG. 4 with which is advantageously combined a codable input switching circuit. The output windings 133 through 138 inductively coupled to the output legs 87 of elements 91 through 96, respectively, of the embodiment of FIG. 4 are associated with information switches 191 through 196, respectively. The information switches 191 through 196 are serially connectable by means of their wipers, and each wiper can contact a terminal *a* or a terminal *b*. At one end of the serial connection of switches 191 through 196 is a serial output terminal 197.

The operation of the circuit of FIG. 5 may be described as follows. Preset parallel information is introduced in the switches 191 through 196 and is represented by the positions of the wipers. Thus switch 191 represents a "1" if its wiper is in contact with the terminal *a* and can represent a "0" if its wiper is in contact with the terminal *b*. Switches 192 through 196 will store "1's" or "0's," respectively, in a similar manner according to which terminals are contacted by the switch wipers. Signals are induced in the output windings 133 through 138, responsive to the sequential switching of the output legs of the elements 91 through 96, as previously described in connection with FIG. 4. The switches 191 through 196 are connected in series with each other when the wiper of each switch is contacting either of its terminals *a* or *b*. Thus, when a switch is contacting a terminal *a*, a signal will be transmitted to the serial output terminal 197 when a flux reversal occurs in the output leg of the element associated with that switch. However, when the switch is contacting a terminal *b*, the output winding of the associated element is bypassed and no output signal will appear at terminal 197 responsive to the switching of the associated element. Thus the binary information introduced into the switches in parallel form can be read out from the output terminal in serial form.

Although switches are shown as the memory elements storing the parallel information in FIG. 5, other memory elements, such as magnetic cores or plug-type units containing entire binary words, are equally within the scope of the present invention.

Figures 6A, 6B, 6C:
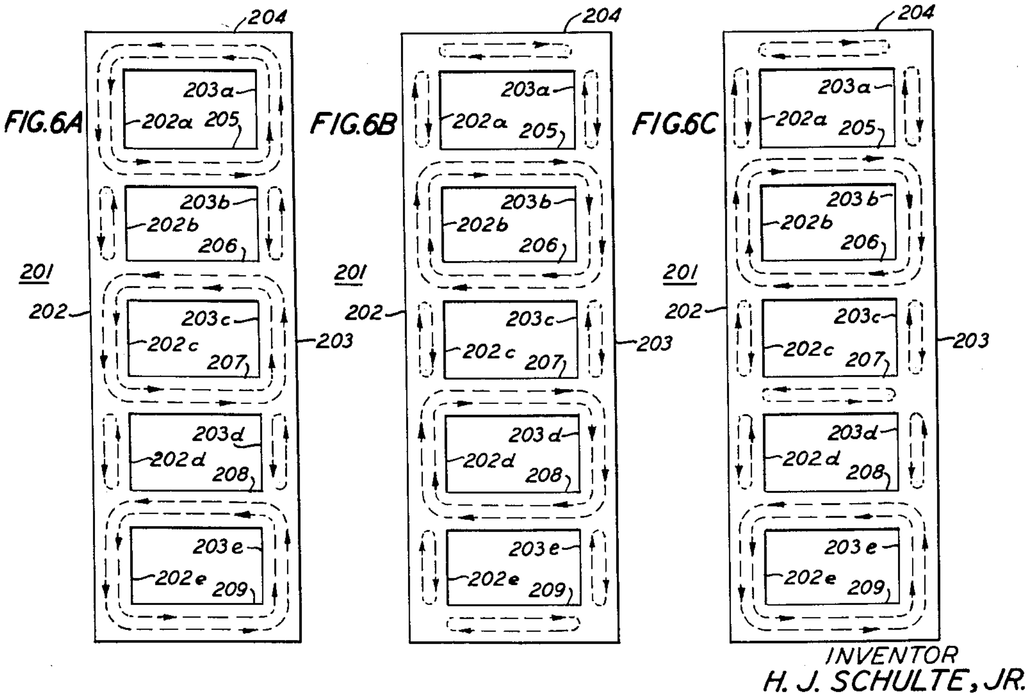
FIGS. 6A, 6B and 6C depict another illustrative multiapertured magnetic element used in the specific embodiment of this invention depicted in FIG. 7 with the magnetic flux distribution symbolized therein at various stages of operation.

FIGS. 6A, 6B and 6C depict an element 201 utilized in the serial-to-parallel conversion circuit to be described in connection with FIG. 7, the magnetic flux distribution being symbolized therein at three stages of its operation. Element 201 of each of FIGS. 6A, 6B and 6C comprises side rails 202 and 203 and legs 204, 205, 206, 207, 208 and 209. The side rails are divided by the legs 204 through 209 into sections 202*a*, 202*b*, 202*c*, 202*d*, 202*e*, 203*a*, 203*b*, 203*c*, 203*d* and 203*e*. FIGS. 6A and 6C represent the element 201 in the reset magnetic state, while FIG. 6B represents the element 201 in the set magnetic state.

Figure 7:
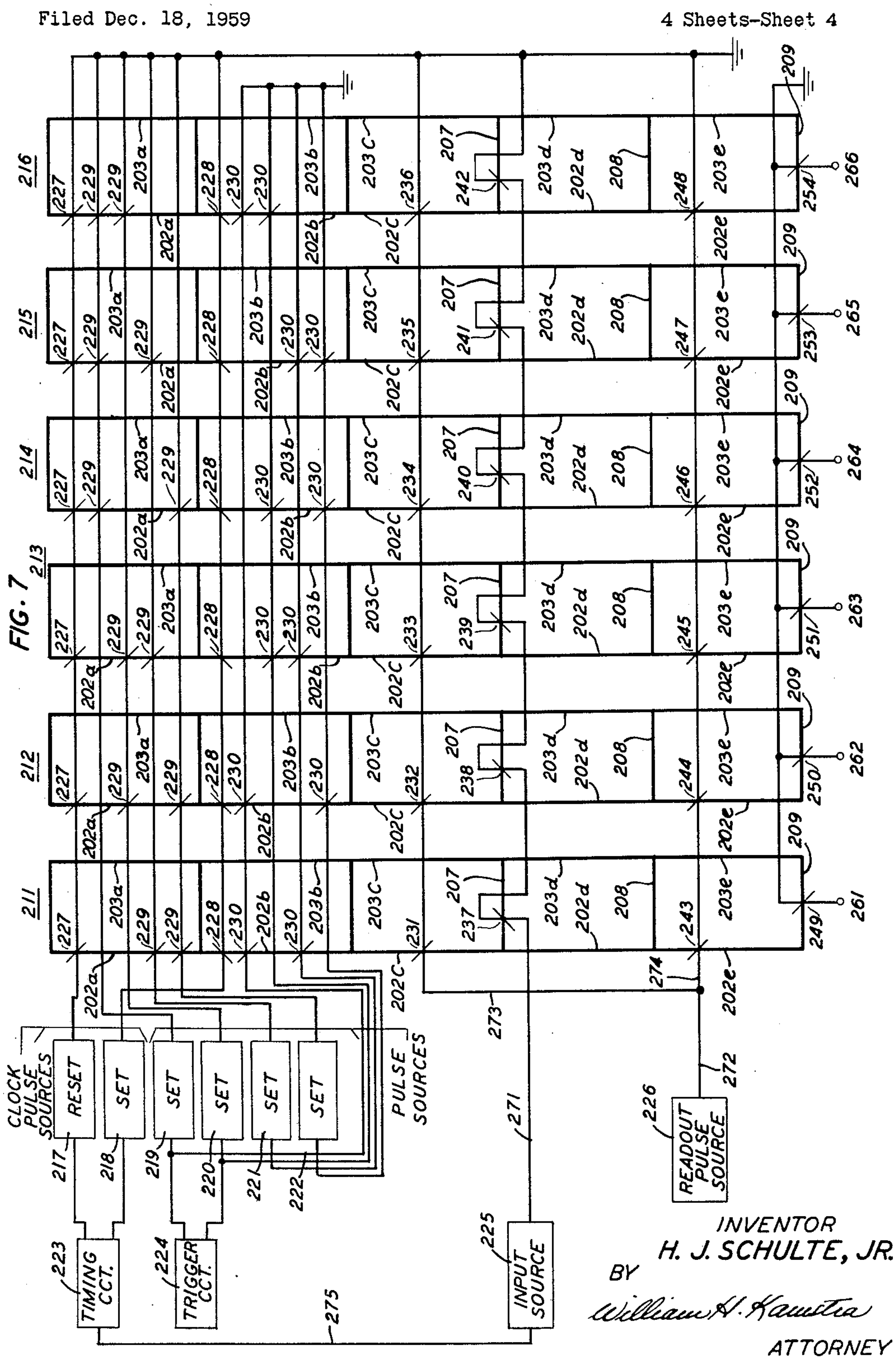
FIG. 7 depicts a mirror symbol diagram of an illustrative serial-to-parallel conversion circuit according to the principles of this invention.

FIG. 7 depicts an illustrative serial-to-parallel conversion circuit according to the principles of this invention, comprising a plurality of multiapertured magnetic elements 211 through 216, each of which in geometry and relative dimensions is identical to the element 201 generally described in connection with FIG. 6. Accordingly, the various portions and members of the elements 211 through 216 will be designated by the same reference characters that were used for the same portions and members of the element 201. The circuit of FIG. 7 advantageously presents aspects and features of this invention also specifically described in the embodiment of FIG. 4. Thus reset clock pulse source 217 and set clock pulse source 218 of FIG. 7 correspond to the clock pulse sources 151 and 152, respectively, of FIG. 4, set pulse sources 219 through 222 of FIG. 7 correspond to the sources 153 through 156, respectively, of FIG. 4, timing circuit 223 and trigger circuit 224 of FIG. 7 correspond to the circuits 139 and 140, respectively, of FIG. 4, reset windings 227 of FIG. 7 correspond to reset windings 97 through 102 of FIG. 4, set windings 228 of FIG. 7 correspond to set windings 115 through 120 of FIG. 4, set windings 229 of FIG. 7 correspond to set windings 103 through 114 of FIG. 4, and control windings 230 of FIG. 7 correspond to the control windings 121 through 132 of FIG. 4. In addition, the embodiment of FIG. 7 comprises input windings 237 through 242 inductively coupled to the legs 207 of elements 211 through 216, respectively, read-out windings 231 through 236 inductively coupled to the side rail portions 202*c* of elements 211 through 216, respectively, read-out windings 243 through 248 inductively coupled to the side rail portions 202*e* of elements 211 through 216, respectively, and output windings 249 through 254 inductively coupled to the output legs 209 of elements 211 through 216, respectively. Circuit 271 serially connects the input windings 237 through 242 and is connected at one end to ground and at its other end to a serial data input source 225. The source 225 is also connected via conductor 275 to the timing circuit 223 to insure that pulses from source 225 are synchronized with phase $\Phi_2$ pulses from source 218. Parallel branches 273 and 274 of a circuit 272 serially connect the read-out windings 231 through 236, and 243 through 248, respectively. The circuit 272 is connected at one end to ground and at its other end to a read-out pulse source 226. Furthermore, output windings 249 through 254 are connected between ground and output terminals 261 through 266, respectively. The input source 225 and read-out pulse source 226 may comprise circuits well known in the art capable of providing current pulses of the proper magnitude and polarity as described hereinafter and, accordingly, are represented in block diagram form only herein.

The operation of the embodiment of FIG. 7 may be generally described as follows. Simultaneous pulses in phase $\Phi_1$ from reset clock pulse source 217 and from the read-out pulse source 226 reset the multiapertured magnetic elements 211 through 216 to the magnetic flux condition represented in FIG. 6A which is the reset flux condition. The phase $\Phi_2$ set clock pulses from source 218 and the serial information pulses from source 225 are synchronized by the timing circuit 223. These serial information pulses are applied to input windings 237 through 242. As explained previously in connection with the embodiment of FIG. 4, each phase $\Phi_2$ set clock pulse from source 218, in combination with pulses from particular ones of the set pulse sources 219 through 222, will cause a flux change in only one element, and successive phase $\Phi_2$ pulses cause flux changes in successive ones of the elements. When a pulse is transmitted by the serial data input source 225 simultaneously with the phase $\Phi_2$ set clock pulse from source 218, the flux will be switched in the output leg 209 of that one element whose output leg would have switched during the similar stage of operation of the embodiment described previously in connection with FIG. 4. In other words, the elements 211 through 216 are successively set by combinations of the set pulse sources 219 through 222 and the input source 225 as were the elements 91 through 96 by combinations of the set pulse sources 153 through 156 of the embodiment of FIG. 4. The flux condition of the one element will be switched to the condition shown in FIG. 6*b* which is the set condition. When no pulse is applied by the serial data input source 225 simultaneously with the phase $\Phi_2$ pulse from source 218, then the flux will not be switched in the output leg 209 of that one element whose output leg would have switched during the similar state of operation of the embodiment described in connection with FIG. 4. Rather, the flux change responsive to the phase $\Phi_2$ pulse from source 218 will then switch through leg 207 since there is no pulse being applied from the source 218 at this time to hold the flux of leg 207 in its previous condition. The flux condition of the element being operated upon will then be switched to the condition shown in FIG. 6C and thus remains in the reset condition since no switching occurred in the output leg 209. The serial data input source 225 thus in effect constitutes a set pulse source which is included in every combination of the set pulse sources 219 through 222 required to cause a setting of an element 211 through 216. Thus binary information in serial form applied from the serial data input source 225 is stored in the output legs 209 of the elements 211 through 216 and can be read out in parallel form as follows. A pulse from the read-out pulse source 226 is applied to windings 243 through 248 when read-out is desired and causes a flux reversal in those output legs 209 switched by the serial data pulses and therefore causes signals to be induced in the ones of the output windings 249 through 254 inductively coupled to those legs. An exemplary word containing six bits can be read out in parallel form by the illustrative circuit of FIG. 7 and a serial-to-parallel conversion circuit is thereby achieved.

It is to be understood that the specific embodiments of this invention are merely illustrative, and numerous other arrangements according to the principles of this invention may be devised by one skilled in the art without departing from the spirit and scope of this invention.

What is claimed is:

1. An electrical circuit comprising a plurality of multi-apertured magnetic elements having substantially rectangular hysteresis characteristics, each of said elements comprising a plurality of flux legs defining a plurality of flux loops, a plurality of set windings linking particular combinations of said flux loops, and a reset winding linking one of said flux loops including an output leg of said plurality of flux legs, a first set circuit means for connecting first set windings of said elements in a predetermined combination, a second set circuit means for connecting a second set winding of each of said elements in series, a third set circuit means for connecting a third set winding of each of said elements in series, a first set pulse source for applying a first set pulse to said first set circuit, a second set pulse source for applying a second set pulse to said second set circuit, a third set pulse source for applying a third set pulse to said third set circuit, said output leg of one of said elements being set responsive to a predetermined combination of said first, second and third set pulses, a reset pulse source for applying a reset pulse to said reset windings, a first output winding for each of said elements, each of said first output windings linking all of the flux loops including the output leg of the associated element, said first output windings energized responsive to the resetting of the included output legs for generating output signals, second output windings linking said last mentioned flux loops of particular ones of said elements also energized responsive to the resetting of the included output legs for generating control signals, and control circuit means operated responsive to said control signals for selectively controlling said second and third set pulse sources.

2. An electrical circuit according to claim 1 also comprising a timing pulse source for alternately energizing said first set pulse source and said reset pulse source.

3. An electrical circuit comprising a plurality of multi-apertured magnetic elements having substantially rectangular hysteresis characteristics, each of said elements having a plurality of flux legs including an output flux leg, said flux legs defining a plurality of closed flux loops, a first set circuit means including first set windings on said elements for controlling flux switching in predetermined first combinations of flux loops in said elements, a second set circuit means including second set windings on said elements for controlling flux switching in predetermined second combinations of flux loops in said elements, a third set circuit means including third set windings on said elements for controlling flux switching in predetermined third combinations of flux loops in said elements, a first, second and third set pulse source for applying set pulses to said first, second and third set circuit means, respectively, and control means for selectively controlling said second and third set pulse sources simultaneously with the energization of said first set pulse source for inducing a set magnetic flux in a flux loop including the output leg of one of said elements.

4. An electrical circuit according to claim 3 also comprising a reset circuit means including reset windings on said elements for controlling flux resetting in the output legs of said elements, a reset pulse source for applying a reset pulse to said reset circuit means, and output windings linking flux loops including said output legs energized responsive to flux resetting in said output legs for generating output signals.

5. An electrical circuit according to claim 4 in which said control means comprises a first and a second control circuit connected to said second and said third set pulse sources, respectively, and means for differently energizing said first and said second control circuits responsive to the resetting of flux in the output legs of each of said elements.

6. An electrical circuit according to claim 4 also comprising means for serially connecting said output windings in predetermined combinations comprising a two position switching means associated with each of said output windings, each of said switching means being connected in series to a succeeding switching means through an output winding when in one of said positions and being connected in series to a succeeding switching means shunting an output winding when in the other of said positions.

7. An electrical circuit according to claim 4 also comprising a serial output circuit and means for serially connecting said output windings in said serial output circuit in predetermined combinations.

8. An electrical circuit according to claim 5 also comprising timing means for alternately energizing said first set pulse source and said reset pulse source.

9. An electrical circuit comprising a plurality of magnetic elements having substantially rectangular hysteresis characteristics, each of said elements having a plurality of flux legs including an output leg, said flux legs defining a plurality of closed flux loops in each of said elements, a first set circuit means including a first set pulse source and first set windings on said elements for controlling flux switching in predetermined first flux loops in each of said elements, a plurality of second set circuit means, each including a second set pulse source and second set windings on said elements for controlling flux switching in predetermined combinations of second flux loops in each of said elements, means for selectively energizing a first combination of said second set pulse sources simultaneously with the energization of said first set pulse source for inducing a set magnetic flux in a flux loop including the output leg of a selected one of said elements, a reset circuit means including a reset pulse source and reset windings on said elements for inducing a reset magnetic flux in the output legs of said elements, and a first output winding linking the flux loop including the output leg of said selected element energized responsive to flux resetting in said last-mentioned output leg for generating an output signal.

10. An electrical circuit according to claim 9 also comprising a plurality of control output circuits, a first combination of said control circuits being connected respectively to a second combination of said second set pulse sources, each circuit of said first combination of control circuits including a control output winding linking the flux loop including the output leg of said selected element, said second combination of said second set pulse sources being energized concurrently with the energization of said first set pulse source responsive to said flux resetting in said last-mentioned output leg for inducing a set magnetic flux in a flux loop including the output leg of another selected one of said elements.

11. An electrical circuit according to claim 10 also comprising trigger means for initially energizing a particular combination of said plurality of second set pulse sources and timing means for alternately energizing said first pulse source and said reset pulse source.

12. An electrical circuit according to claim 10 in which each of said control output windings is connected to a different combination of said second pulse sources.

13. An electrical circuit according to claim 10 in which each of the elements has particular ones of said control output windings linking the flux loops including the output legs thereof connected to a different combination of said second pulse sources.

14. An electrical circuit comprising a plurality of multiapertured magnetic elements having substantially rectangular hysteresis characteristics, each of said elements having a plurality of flux legs including an output flux leg, said flux legs defining a plurality of closed flux loops, each of said flux legs having substantially equal minimal cross-sectional areas, a first set circuit means including a first set pulse source and first set windings on said elements for controlling flux switching in predetermined first flux loops in each of said elements, a plurality of second set circuit means, each including a second set pulse source and second set windings on said elements for controlling flux switching in predetermined combinations of second flux loops in each of said elements, an input circuit means including an input pulse source and input windings on said elements for controlling flux switching in predetermined third flux loops in each of said elements, means for selectively energizing a first combination of said second pulse sources simultaneously with the energization of said first set pulse source and said input pulse source for inducing a set magnetic flux in a flux loop including the output leg of a selected one of said elements, a read-out circuit means including a read-out pulse source and read-out windings on said elements for inducing a reset magnetic flux in the output legs of said elements, and output windings linking respectively flux loops including the output leg of each element energized responsive to the flux resetting in said output legs for generating output signals.

15. A pulse switching circuit comprising a plurality of magnetic elements each having substantially rectangular hysteresis characteristics, each of said elements having a plurality of flux limited legs including an output leg therein, reset means including reset windings on each of said elements and a first reset pulse source for establishing a reset flux distribution in each of said elements, a plurality of set circuits each including set windings coupled to particular flux legs of predetermined combinations of said elements, the set windings of each of said set circuits being coupled in the same sense to corresponding flux legs of the elements of their predetermined combination of elements, a plurality of set pulse sources connected respectively to said plurality of set circuits, control means for energizing particular combinations of said set pulse sources for inducing a set flux distribution in one of said elements including an output leg thereof, and an output winding coupled to said last-mentioned output leg energized responsive to said establishing of said reset flux distribution in said one of said elements for generating an output signal.

16. A pulse switching circuit comprising a plurality of magnetic elements each having substantially rectangular hysteresis characteristics, each of said elements having a plurality of flux limited legs including an output leg therein, reset means including reset windings on each of said elements and a first reset pulse source for establishing a reset flux distribution in each of said elements, a plurality of set circuits each including set windings coupled to particular flux legs of predetermined combinations of said elements, a plurality of set pulse sources connected respectively to said plurality of set circuits, control means for energizing particular combinations of said set pulse sources for inducing a set flux distribution in one of said elements including an output leg thereof; said control means comprising a plurality of control windings coupled to particular flux legs of each of said elements and a plurality of control circuits, each including the control windings of a predetermined combination of said elements and each being connected to a respective one of said set pulse sources; and an output winding coupled to said last mentioned output leg energized responsive to said establishing of said reset flux distribution in said one of said elements for generating an output signal.

17. A pulse switching circuit as claimed in claim 16 in which one of said set pulse sources comprises a source of input information.

18. A pulse switching circuit as claimed in claim 17 in which said reset means includes a read-out second reset pulse source and read-out reset windings on each of said elements, said reset flux distribution being established on the simultaneous energization of said first and said read-out second reset pulse sources.

References Cited in the file of this patent

UNITED STATES PATENTS 2,884,622 Rajchman -------------- Apr. 28, 1959